(12) United States Patent
Ejima

(10) Patent No.: US 8,157,116 B2
(45) Date of Patent: Apr. 17, 2012

(54) ELECTRICAL JUNCTION BOX

(75) Inventor: Takumi Ejima, Yokkaichi (JP)

(73) Assignee: Sumitomo Wiring Systems, Ltd., Mie (JP)

(*) Notice: Subject to any disclaimer, the term of this patent is extended or adjusted under 35 U.S.C. 154(b) by 36 days.

(21) Appl. No.: 12/801,301

(22) Filed: Jun. 2, 2010

(65) Prior Publication Data
US 2010/0326690 A1  Dec. 30, 2010

(51) Int. Cl.
*H02G 3/08* (2006.01)
(52) U.S. Cl. .......................... 220/3.2; 174/58
(58) Field of Classification Search ........... 220/3.2, 220/3.9, 4.02; 174/58
See application file for complete search history.

(56) References Cited

U.S. PATENT DOCUMENTS
1,592,990 A * 7/1926 Raquette et al. ............. 220/3.92

FOREIGN PATENT DOCUMENTS
| JP | U-06-084728 | 12/1994 |
| JP | A-09-008469 | 1/1997 |
| JP | A-11-187539 | 7/1999 |
| JP | A-2003-078255 | 3/2003 |

* cited by examiner

*Primary Examiner* — Harry Grosso
(74) *Attorney, Agent, or Firm* — Oliff & Berridge, PLC

(57) ABSTRACT

To provide an electrical junction box having a new structure that can decrease the size of the electrical junction box and can provide a drain hole in a bottom wall to prevent water from entering the drain hole from the outside. A bottom wall 24 of a lower cover 20 is provided on an outer surface with a bracket fitting section 28. A separated bracket 14 is attached to the bracket fitting section 28. A relay box 10 is attached through the bracket 14 to a motor vehicle. Drainage holes 42*a* and 42*b* formed in the bottom wall 24 of the lower cover 20 are covered by at least one of the bracket fitting section 28 and the bracket 14.

6 Claims, 4 Drawing Sheets

ELECTRICAL JUNCTION BOX

INCORPORATION BY REFERENCE

This application claims priority to JP 2009-152723 filed in Japan on Jun. 26, 2009, the disclosure of which is hereby incorporated by reference in its entirety.

BACKGROUND

This invention relates to an electrical junction box to be mounted on a motor vehicle or the like and more particularly relates to an electrical junction box that includes a drainage structure.

An electrical junction box such as a fuse box, a relay box, and a junction box may be installed in a vehicle room or an engine room in a motor vehicle while obtaining a suitable space.

Fuses, electronic circuits, and electrical circuit such as connectors are generally found in the electrical junction box. If water enters the electrical junction box, the water may cause some problems such as current leak, short circuit, or the like. Accordingly, it is preferable to prevent water from entering the electrical junction box. However, because electrical wires are generally arranged in the electrical junction box to connect electrical circuits in the electrical junction box to external electrical circuits, the electrical junction box cannot be fully sealed.

If water should enter the electrical junction box, it is preferable to drain the water rapidly to avoid serious damage to the electrical circuits. In view of this purpose, JP HEI 11(1999)-187539 A has proposed an electrical junction box in which a drainage hole is provided in a bottom portion.

However, in the case where the electrical junction box is installed in the engine room, there will be possibility that water splashed during moving in rain or car-washing may enter the electrical junction box.

In order to overcome the above problems, there will be ideas of providing a special waterproof wall on the drainage hole or providing a check valve in the drainage hole. However, these ideas will involve a complicated structure and difficulty in production, and the electrical junction box will be larger on account of the water proofing wall or the check valve. It is difficult to realize these ideas.

SUMMARY

In view of the above problems, an object of the present invention is to provide a smaller electrical junction box and can provide a drain hole in a bottom wall to prevent water from entering the drain hole from the outside.

A first aspect of the present invention is directed to an electrical junction box to be installed in a motor vehicle, wherein a bottom wall of the electrical junction box is provided on an outer surface with a bracket fitting section, a separated bracket is attached to the bracket fitting section, the electrical junction box is installed in the motor vehicle through the bracket, the bottom wall of the electrical junction box is provided with a drainage hole, and the drainage hole is covered from the outside by at least one of the bracket fitting section and the bracket.

According to the first aspect of the present invention, because the bracket fitting section is provided on the bottom wall, it is possible to cover the drainage hole by utilizing the conventional bracket used to attach the electrical junction box to the vehicle. Accordingly, it is possible to avoid the electrical junction box from being larger than necessary, increasing the number of parts, and making a complicated structure, and it is also possible to prevent water from entering the electrical junction box from the drain hole.

A second aspect of the present invention is directed to an electrical junction box according to the first aspect of the present invention, wherein the bracket fitting section is formed into a box-like configuration that is open at a side of the bottom wall, the bracket is provided with an engaging section to be inserted into and engaged with the bracket fitting section from a side, and the drainage hole is provided in the bracket fitting section formed into the box-like configuration.

According to the second aspect of the present invention, the bracket engaging section and the bracket fitting section can cover the drainage hole. In result, it is possible to obtain a higher water proofing effect.

A third aspect of the present invention is directed to an electrical junction box according to the first or second aspect of the present invention, wherein the electrical junction box is formed into a box-like configuration, the bottom wall is provided in an intermediate part at opposite sides in a width direction with a pair of drainage holes, and the bottom wall is provided with a slant section having a V-shaped cross section and extending from one longitudinal end to a longitudinal intermediate part of the bottom wall.

According to the third aspect of the present invention, because the bottom wall is formed into the V-shaped configuration, it is possible to exert a reinforcement effect in the bottom wall required for great strength to receive the bracket. The V-shaped configuration, in which a central portion is convex, can lead water that enters the electrical junction box along the slant inner surface of the bottom wall to the drainage holes, thereby enhancing a drainage effect.

In addition, because the drainage holes are provided on the lateral (width) opposite sides of the bottom wall, even if the electrical junction box is installed vertically or slantingly in a vehicle body, the drainage holes can exert a drainage effect and the electrical junction box can obtain a general-purpose.

According to the present invention, it is possible to cover the opening in the drainage hole by artfully utilizing the bracket that has been conventionally used to attach the electrical junction box to the motor vehicle or by utilizing the bracket fitting section to which the bracket is attached. Consequently, it is possible to avoid the electrical junction box from being larger than necessary, increasing the number of parts, making a complicated structure and it is also possible to prevent water from entering the electrical junction box from the drainage hole.

DETAILED DESCRIPTION OF EMBODIMENTS

Figure 1:
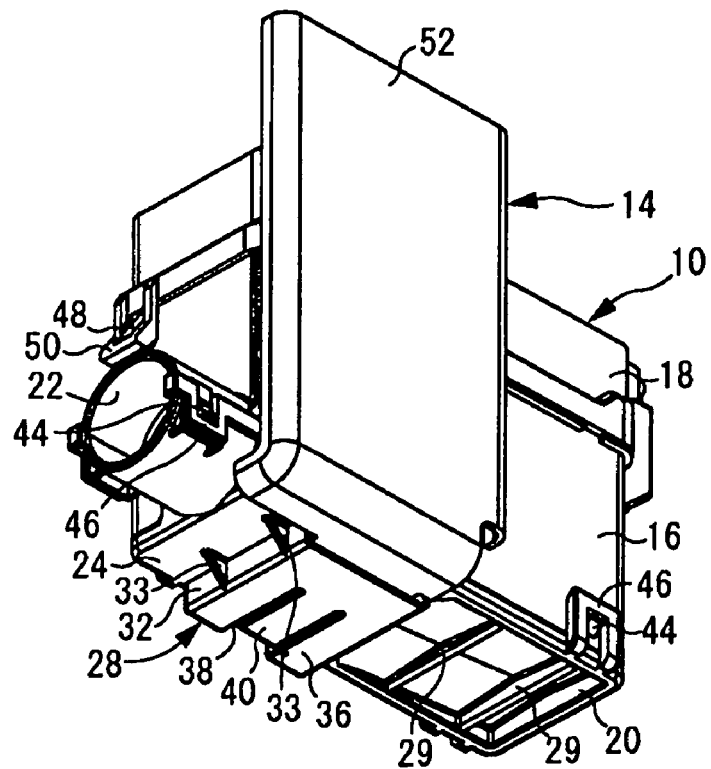
FIG. 1 is a perspective view of an embodiment of a relay box in accordance with the present invention, illustrating a bracket attached to the relay box.

Referring now to the drawings, embodiments of an electrical junction box in accordance with the present invention will be described below. Generally, reference to upper and lower directions are made with respect to the junction box in the installed position as shown in FIG. 1.

FIG. 1 shows an embodiment of a relay box 10 that is an example of an electrical junction box in accordance with the present invention. The relay box 10 can be generally installed through a bracket 14 in an engine room or the like of a motor vehicle.

Figure 2:
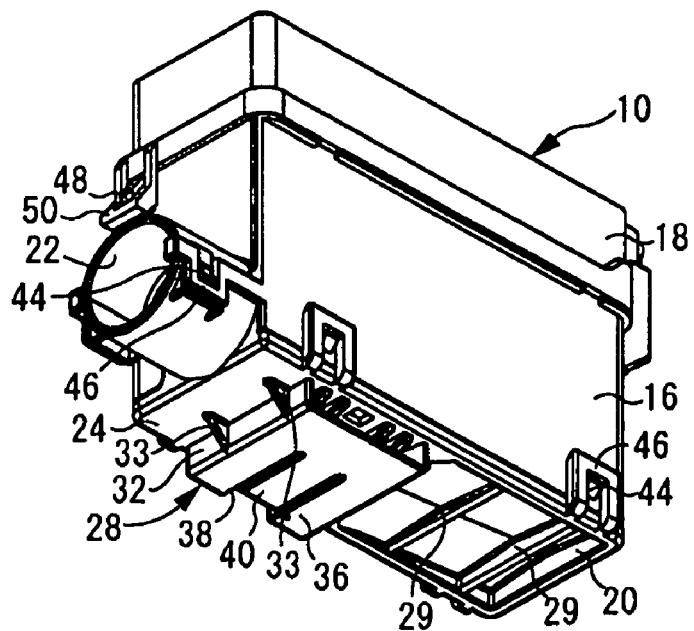
FIG. 2 is a perspective view of the relay box.
Figure 3:
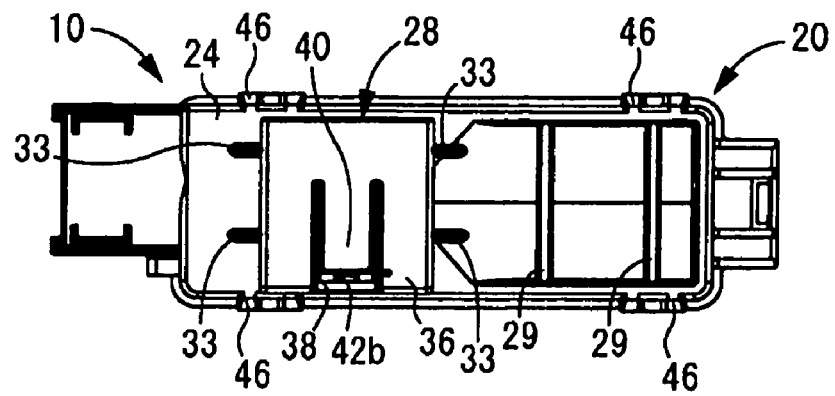
FIG. 3 is a bottom view of the relay box.

Specifically, as shown in FIGS. 2 and 3, the relay box 10 is generally formed into a box-like configuration that includes a casing body 16, an upper cover 18, and a lower cover 20. The covers 18 and 20 are attached to the casing body 16. Relays housed in the casing body 16 are connected to a wire harness (not shown). The wire harness is led outward from a wire-drawing outlet 22 provided in a side wall of the casing body 16.

The casing body 16 can be formed into a frame-like configuration that is open at an upper side and a lower side. The casing body 16 can be provided on an inner peripheral surface with a relay containing section (not shown) for housing relays.

The upper cover 18 can be formed into a box-like configuration that is open downward. The upper cover 18 can be attached to the casing body downward to close an upper opening in the casing body 16.

Figure 4:
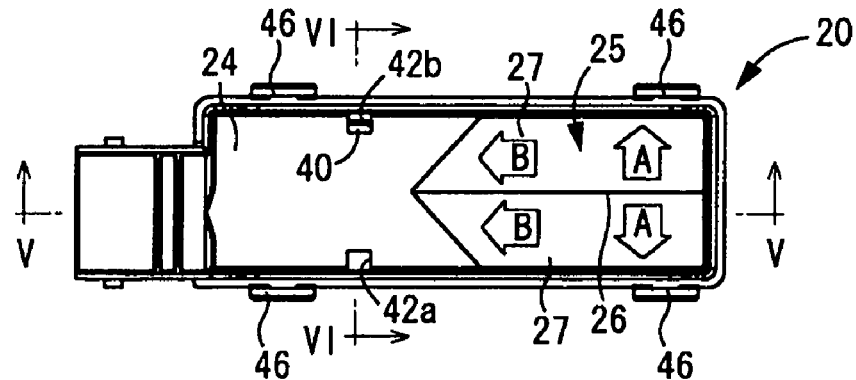
FIG. 4 is a plan view of a lower cover.
Figure 5:
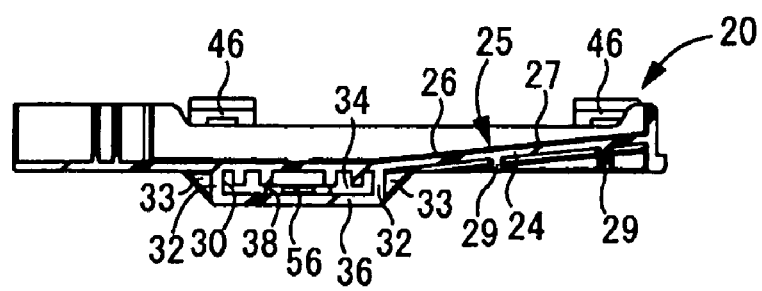
FIG. 5 is a longitudinal section view of the relay box taken along lines V-V in FIG. 4.
Figure 6:
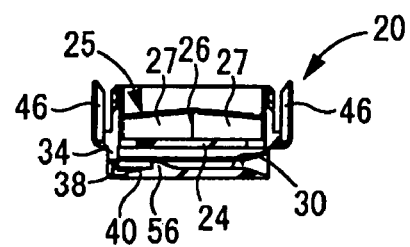
FIG. 6 is a cross section view of the relay box taken along lines VI-VI in FIG. 4.

As shown in FIGS. 4 to 6, the lower cover 20 can be generally formed into a shallow rectangular dish-like configuration. The lower cover 20 is generally attached to the casing body 16 from underneath to close a lower opening in the casing body 16. That is, when the relay box 10 is mounted on the motor vehicle, a bottom wall 24 of the lower cover 20 should define a bottom wall of the casing body 16 to temporarily accumulate water that enters the casing body 16.

The bottom wall 24 is generally provided with a slant section 25 that has a V-shaped cross section protruding upward and extending from an end (a right end in FIG. 4) to an intermediate part in a longitudinal direction. The slant section 25 includes slant surfaces 27 extending from a ridge 26 downward in a width direction. The ridge 26 extends longitudinally on a central part of the bottom wall 24 in the width direction.

Two reinforcement ribs 29 are provided on the bottom wall 24 at a rear side of the slant section 25. The reinforcement ribs 29 extend in a whole width of the slant section 25 and are spaced apart from each other by a given distance. Thus, it is possible to avoid a deformation of the lower cover 20 caused by an external force applied from the ridge 26 to the width direction on the slant section 25. The number and positions of the reinforcement ribs 29 are not limited to the present embodiment.

Each slant surface 27 extends downward from one longitudinal end to the other longitudinal end on the bottom wall 24. Thus, water that enters the relay box 10 flows toward outer sides of the bottom wall 24 in the width direction (in directions shown by arrows A in FIG. 4) and at the same time water from the one longitudinal end flows to the other longitudinal end (in directions shown by arrows B in FIG. 4).

The bottom wall 24 may be provided on the other longitudinal end (a left side end in FIG. 5) with a bracket fitting section 28 extruding downward from a bottom surface of the bottom wall 24. The bracket fitting section 28 may be formed into a rectangular block-shaped configuration that extends from one lateral (width) end to the other lateral (width) end of the bottom wall 24. The bracket fitting section 28 may be provided with a recess chamber 30 that is open at a side of the one lateral end of the bottom wall 24. Thus, the bracket fitting section 28 is generally formed into a box-like configuration that is open at a side of the bottom wall 24.

Side walls 32 of the recess chamber 30 extend from one lateral (width) end to the other lateral (width) end of the bottom wall 24. Thus, the bracket fitting section 28 reinforces an area near the other longitudinal end that is not provided with the V-shaped configuration on the bottom wall 24.

Two pairs of reinforcement ribs 33 are provided on the bottom wall 24 and are spaced apart from each other by a given distance to couple the respective side walls 32 and the bottom wall 24 to one another. Thus, when an engaging section 54 of a bracket 14 mentioned after is engaged with the bracket fitting section 28, corner portions of the bottom wall 24, in which a stress is mostly concentrated in connection with rocking of a vehicle, are reinforced, thereby avoiding a failure between the bottom wall 24 and the side walls 32. The number and positions of the reinforcement ribs 33 are not limited to the above embodiment.

The bracket fitting section 28 may be provided with cut-out portions 38 extending from an inner wall 34 of the recess chamber 30 to a bottom wall 36. These cut-out portions 38 define a cantilever type elastic engaging piece 40 integrated with the bottom wall 36 at one end side.

The bottom wall 24 may be provided with a pair of drainage holes 42a and 42b that are disposed at a position of the bracket fitting section 28 near the other longitudinal end side than downstream sides of the slant surfaces 27 (the downstream ends in the slanting directions shown by arrows B in FIG. 4). The pair of drainage holes 42a and 42b are provided on the lateral (width) opposite sides on the bottom wall 24. Thus, one drainage hole 42a may be open toward the bottom wall 36 of the recess chamber 30 in the bracket fitting section 28, while the other drainage hole 42b may be open toward the cut-out portions 38. As a result, the one drainage hole 42a is covered by the bottom wall 36 of the recess chamber 30 in the bracket fitting section 28, while the other drainage hole 42b is partially covered by the elastic engaging piece 40 defined between the cut-out portions 38.

When locking portions 46 provided on the lower cover 20 constructed above are engaged with engaging pawls 44 provided on a lower part on a peripheral wall of the casing body 16, the lower cover 20 may be attached to the casing body 16. Thus, the lower side opening in the casing body 16 is covered by the lower cover 20. When engaging pawls 48 provided on the casing body 16 are engaged with locking portions 50 provided on the upper cover 18, as is the case with the lower cover 20, the upper cover 18 may be attached to the casing body 16. Thus, the upper side opening in the casing body 16 may be covered by the upper cover 18. Consequently, the relay box 10 is formed into the box-like configuration.

The bracket 14 may be attached to the relay box 10. The bracket 14 may be substantially formed into a generally L-shaped configuration that includes an attaching plate 52 adapted to be disposed on a mounting section of the motor vehicle and a plate-like engaging section 54 secured to an end edge portion of the attaching plate 52.

Figure 7:
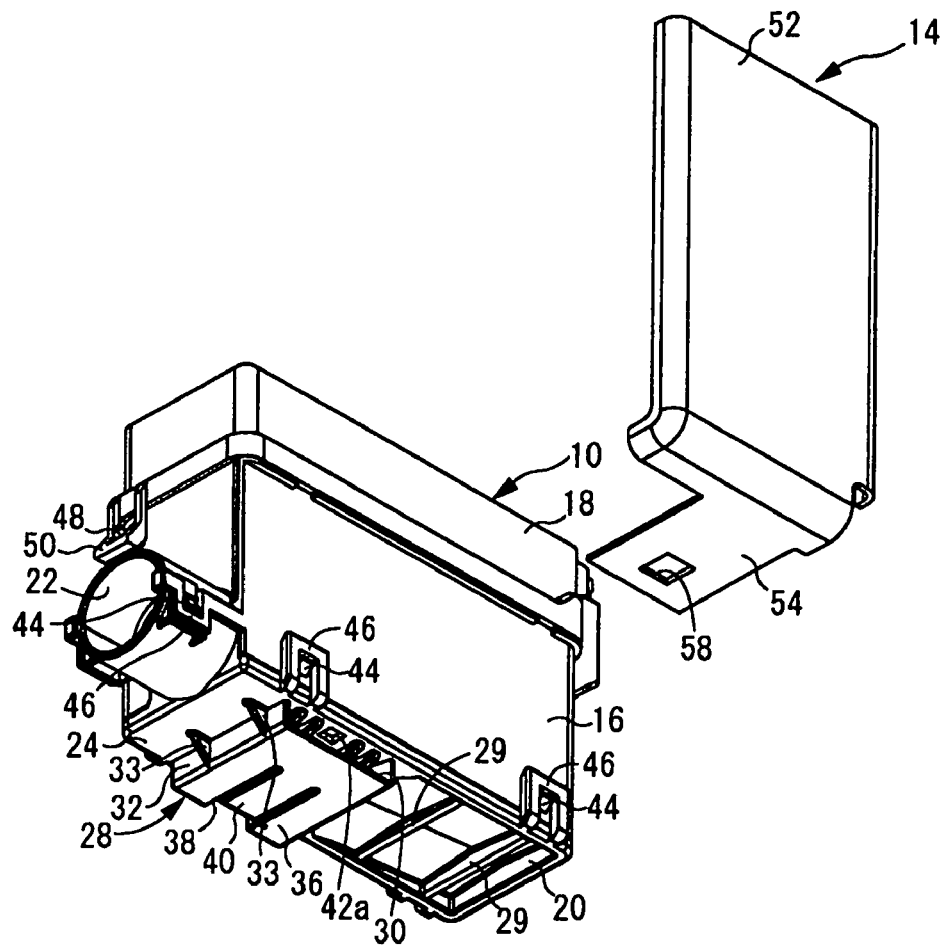
FIG. 7 is a perspective view of the relay box and bracket, illustrating an assembling direction of the bracket to the relay box.
Figure 8:
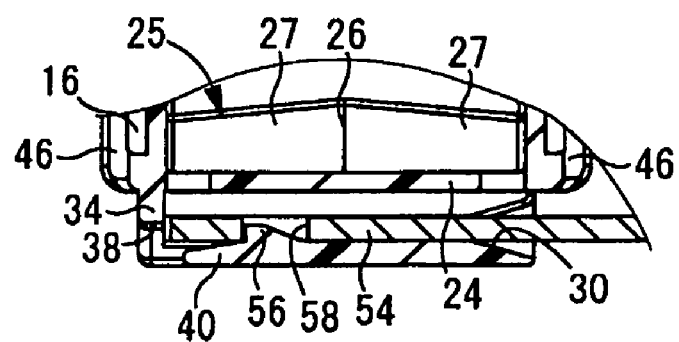
FIG. 8 is a cross section view taken along lines VI-VI in FIG. 4, illustrating a drainage hole covered with an engaging segment.

As shown in FIG. 7, when the engaging section 54 is inserted into the bracket fitting section 28, the bracket 14 is attached to the relay box 10. Under this condition, as shown in FIG. 8, an engaging projection 56 provided on the elastic engaging piece 40 is engaged with an receiving hole 58 in the engaging section 54. Thus, when the engaging plate 52 of the bracket 14 is disposed on the mounting section of the motor vehicle and secured to the section by a bolt, the relay box 10 is secured through the bracket 14 to a vehicle body.

The engaging section 54 inserted into the bracket fitting section 28 is opposed to an inner wall 34 of the recess chamber 30 through a slight clearance. Thus, all of the drainage holes 42a and 42b are covered by the engaging section 54 extending over the whole length in a depth direction of the bracket fitting section 28.

In such relay box 10, merely by locking the engaging section 54 of the bracket 14 onto the bracket fitting section 28 provided on the bottom wall 24 of the lower cover 20, the drainage holes 42a and 42b can be covered from the outside. Accordingly, it is possible to prevent water from entering the drainage holes 42a and 42b by using a conventional bracket without adopting a special member. Consequently, it is possible to reduce the number of parts and to downsize the relay box 10.

Because the drainage holes 42a and 42b are provided in the bracket fitting section 28 to be open therein, it is possible to cover the drainage holes 42a and 42b while minimizing the size of the bracket.

The one drainage hole 42a is covered dually by the engaging section 54 of the bracket 14 and the bottom wall 36 in the recess chamber 30 of the bracket fitting section 28. The other drainage hole 42b is partially covered by the elastic engaging piece 40 at the outside of the engaging section 54 of the bracket 14. Thus, it is possible to more effectively prevent water from entering the drainage holes 42a and 42b.

Further, the slant section 25 may be provided on the bottom wall 24 of the lower cover 20 from the one longitudinal end to the longitudinal intermediate part and the bracket fitting section 28 may be provided on the bottom wall 24 near the other longitudinal end at the outside of the slant section 25 so that the bracket fitting section 28 extends in the whole width of the bottom wall 24. Thus, it may be possible to enhance strength of the bottom wall 24 to which a supporting force exerted by the bracket is directly applied upon receiving the bracket 14.

In addition, the slant surfaces 27 are provided on the upper surface of the slant section 25 provided on the bottom wall 24 of the lower cover 20, and the drainage holes 42a and 42b are provided in the bottom wall 24 at the position near the side of the longitudinal other end rather than the longitudinal downstream side of the bottom wall 24 on the slant surfaces 27 (at the downstream end in the slanting directions shown by the arrows B in FIG. 4). Thus, the slant surfaces 27 lead the water entering the relay box 10 to the lateral (width) directions of the bottom wall 24 and to cause the water to flow out of the drainage holes 42a and 42b readily. Accordingly, it is possible to effectively prevent water from wetting a wire harness extending from relays contained in the relay box through a central part of the bottom wall 24 out of the wire-drawing outlet 22.

Because the bottom wall 24 is provided on the lateral opposite ends with the drainage holes 42a and 42b, the water that enters the relay box 10 can be discharged out from at least one of the drainage holes 42a and 42b. Thus, even if the relay box 10 is installed in the vehicle body in a vertical position or in an inclined position in the width direction, one of two slant directions of the slant surfaces 27 (either the slant directions shown by the arrows A or the slant directions shown by the arrows B in FIG. 4) acts to lead the water that enters the relay box 10 to the drainage holes 42a and 42b to exert the same draining effect, thereby enhancing a general-purpose of the relay box 10.

Although the embodiment of the present invention is described above, the invention is not limited to the above embodiment. For example, the present invention can be applied to various kinds of electrical junction boxes such as a relay box or a connector holder.

Although the drainage holes 42a and 42b that are open in the bottom wall 24 are covered by the engaging section 54 of the bracket 14 and the bracket fitting section 28 of the lower cover 20 in the above embodiment, the drainage holes may be covered by at least one of the bracket and the bracket fitting section in the present invention. Although the lower cover 20 attached to the casing body 16 that has upper and lower openings is provided with the bracket fitting section 28 in the above embodiment, the lower cover 20 may be omitted, the casing body may be provided with a bottom wall, and the casing body may be provided directly on a bottom surface with the bracket fitting section.

What is claimed is:

1. An electrical junction box configured to be installed on a bracket that is configured in a motor vehicle, the electrical junction box comprising:
    a bottom wall having an outer surface, the bottom wall further comprising:
        a bracket fitting section provided on the outer surface, that is configured to couple the electrical junction box to the motor vehicle by way of the bracket; and
        a drainage hole, wherein the drainage hole is covered by at least one of the bracket fitting section and the bracket, wherein the bottom wall is provided with a slant section having a V-shaped cross section and extending from one longitudinal end of the bottom wall to a longitudinal intermediate part of the bottom wall.

2. An electrical junction box according to claim 1, wherein said bracket fitting section is formed in a box configuration that is configured with an opening at a side of the bottom wall such that an engaging section of the bracket couples the bracket fitting section via the opening.

3. An electrical junction box according to claim 2, wherein the drainage hole is configured in the bracket fitting section formed in the box configuration.

4. An electrical junction box according to claim 1, wherein the drainage hole comprises a pair of drainage holes configured opposite from each other on a peripheral edge of the bottom wall.

5. An electrical junction box according to claim 4, wherein at least one of the pair of drainage holes is covered by an engaging section of the bracket when the electrical junction box is coupled to the motor vehicle.

6. An electrical junction box according to claim 4, wherein the pair of drainage holes are configured proximal to the longitudinal intermediate part of the bottom wall.

\* \* \* \* \*